Patented Jan. 6, 1953

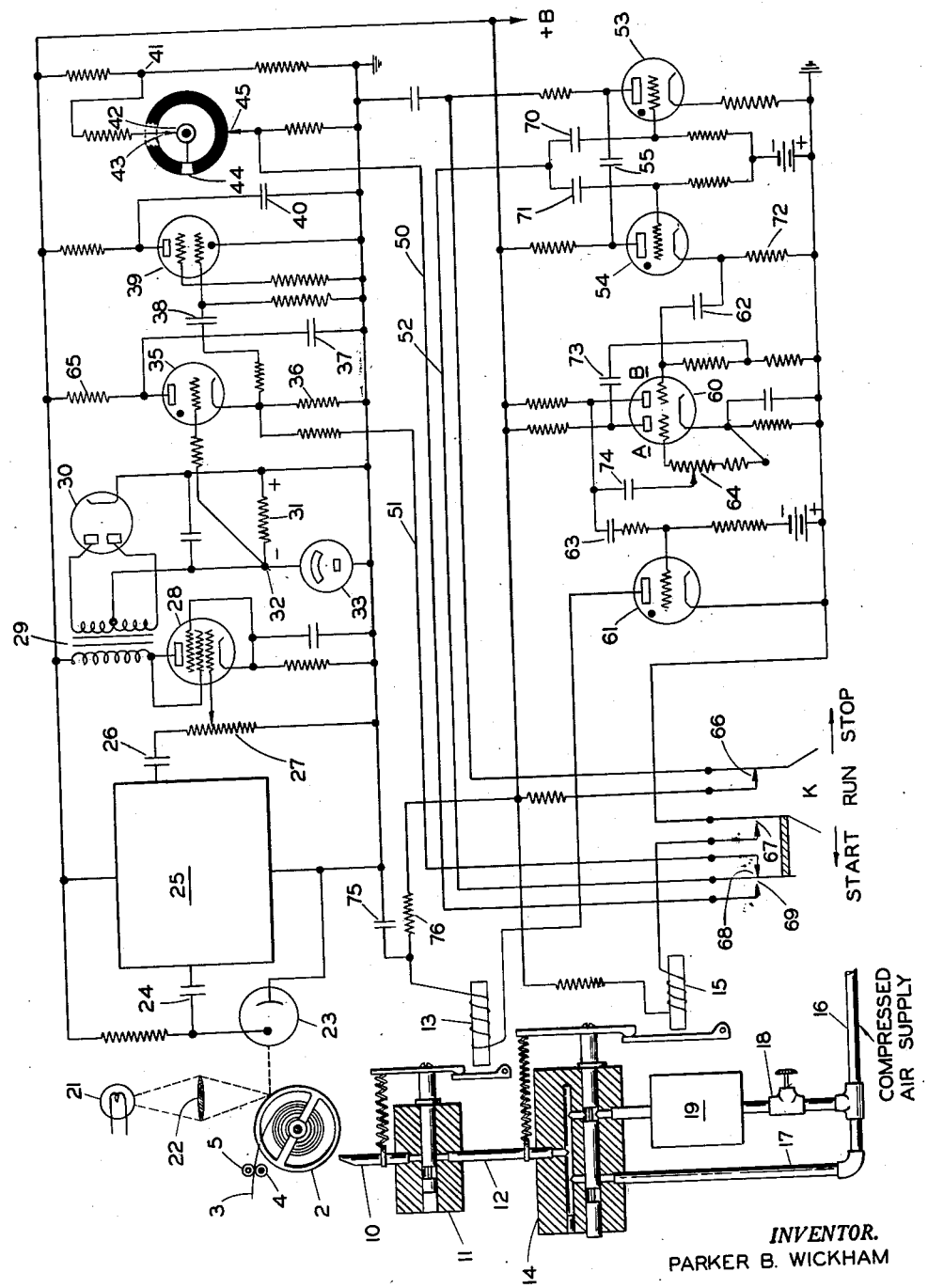

2,624,194

UNITED STATES PATENT OFFICE 2,624,194

TIMING APPARATUS FOR CLOCKS AND WATCHES

Parker B. Wickham, Delavan, Wis., assignor to The George W. Borg Corporation, Delavan, Wis., a corporation of Delaware Application March 31, 1948, Serial No. 18,197

10 Claims. (Cl. 73—6)

1

The present invention relates in general to timing apparatus for clocks and watches, and more in particular to apparatus for timing and regulating the rate of the balance wheel of a clock or watch before it is assembled with the rest of the movement. It is the common practice in the art to regulate the rate of a balance wheel by adjusting the length of the associated hairspring while the balance wheel is oscillating or vibrating and the operation is commonly referred to as hairspring vibrating.

Apparatus for hairspring vibrating as referred to in the foregoing is disclosed in the patent to Gibbs et al, No. 2,231,849, granted February 11, 1941. According to the patent disclosure a balance wheel to be regulated is temporarily supported in suitable bearings and is oscillated by hand, that is, it is started by hand and is allowed to oscillate freely at its natural frequency, the oscillations continuing long enough to permit the hairspring to be adjusted. Or the balance wheel may be restarted one or more times if necessary.

In a modified form of the foregoing apparatus which has many advantages, particularly for regulating small balance wheels, means is provided for positively driving a balance wheel by impulses or puffs of air. These impulses are generated by the mechanism which is controlled responsive to the motion of the wheel and the satisfactory operation of the apparatus thus involves the problem of starting the wheel or setting it in motion in order that the driving impulses may be generated.

The invention is directed to the above problem and provides means for generating and delivering starting impulses to a wheel to set it in motion with the proper amplitude and for then switching over to drive the wheel by running impulses which are generated responsive to motion of the wheel.

The invention and various features thereof will be described more in detail in the specification which follows, reference being had to the accompanying drawing, which shows diagrammatically the circuits and apparatus of a hairspring vibrating installation to which the invention is applied.

Referring to the drawing, the apparatus which is indicated therein will be briefly described.

The reference character 2 indicates a balance wheel having a hairspring 3, which is to be tested and adjusted. The balance wheel is supported on a suitable stand (not shown) having bearings for the balance arbor so arranged that the balance wheel can be quickly placed in position and removed. The end of the hairspring 3 is clamped between the two rollers 4 and 5, one of which is manually rotatable to feed the hairspring in and out to adjust its effective length. A suitable stand for the purpose is well known and need not be further described.

2

The reference character 10 indicates a nozzle for delivering impulses of air to the balance wheel 2. The air impulses are generated by opening the air valve 11 responsive to momentary energizations of the electro-magnet 13. These impulses may be relatively strong starting impulses or moderate running impulses, depending on the position of the switching valve 14, operated by the electro-magnet 15. When the valve 14 is in its normal position as shown in the drawing, air is supplied to the pipe 12 and valve 11 from the main supply pipe 16 over a path which includes the reducing valve 18 and surge tank 19. This is the condition under which the operation of valve 11 generates running impulses. When the valve 14 is in operated position (electro-magnet 15 energized) the connection above described is closed off and a direct path is established over which the supply pipe 16 is connected to pipe 12 by way of pipe 17. Under this condition, the operation of valve 11 generates starting impulses.

The supply pipe 16 is connected to a suitable pump and reservoir system for supplying compressed air at constant pressure, and the system includes means for regulating the pressure to a value which is suitable for starting the wheels.

The reference character 21 indicates a source of light, while 22 indicates a lens or optical system arranged to project a light beam on to the rim of the balance wheel 2. The photo-cell 23 is located so as to intercept the reflected beam, and generates electrical voltages responsive to the movement of the balance wheel, as explained in the Patent No. 2,231,849 previously referred to.

The output of the photo-cell 23 is transmitted to an amplifier, represented by the rectangle 25, which may be of any known and suitable construction.

The tube 28 may be a type 6F6 pentode and has its control grid coupled to the amplifier 25 by means of a condenser 26 and the volume control potentiometer 27.

The reference character 29 indicates a transformer, the primary winding of which is included in the plate circuit of tube 28. The secondary windings of the transformer 29 are connected in a direct current circuit which includes the full wave rectifier tube 30 and the load resistor 31. The tube 20 may be a type 6X5G tube. A voltmeter 33 is connected to indicate the drop across the resistor 31.

The tube 35 may be a type 884 Thyratron tube, connected as shown. It will be noted that the control grid of the tube is connected to the negative end of resistor 31, at junction 32.

The tube 39 is preferably a type 631P1 Strobotron tube, forming part of a stroboscopic indicator such as disclosed in the patent to Gibbs, No. 2,361,281, granted October 24, 1944. The indicator includes a drum rotated at constant speed and is modified in accordance with the present invention by the addition of an impulse transmitter, including rotating parts, which can be conveniently constructed as part of the drum. As shown diagrammatically herein, the impulse transmitter comprises a slip ring 42 and brush 43 for maintaining the junction point 41 connected to the contact segment 44, and a brush 45 cooperating with segment 44 to generate impulses during the rotation of the drum.

The slip ring may be mounted on the shaft which supports the drum, as indicated in the drawing, while the segment 44 is carried on the drum, which is made of insulating material as described in the Gibbs patent above referred to. The brushes 43 and 45 may be supported in a suitable brush holder mounted on the base of the indicator.

The impulse transmitter 44—45 and the Thyratron tube 35 are adapted to transmit impulses over conductors 50 and 51, respectively, and the conductor 52, to the grids of the tubes 53 and 54, as will be explained presently.

The tubes 53 and 54 may be type 884 Thyratron tubes and are connected in a known circuit arrangement in which they fire alternately in response to successive impulses received over conductor 52. The grids of the tubes have a fixed negative bias as indicated and the plates are connected by the condenser 55.

The tube 60 may be a type 6N7 double triode and is wired according to a known circuit arrangement in which it operates as a delay device. It receives impulses through condenser 62 from tube 54 and transmits them after a short time delay to the grid of tube 61 by way of condenser 63. The length of the delay period can be adjusted by means of the potentiometer 64.

The tube 61 may be a type 2050 Thyratron and functions to control the circuit of the electro-magnet 13 of the air valve 11.

The operator is provided with a key K for controlling the apparatus. This key may be a telephone type key, and has a normal or "run" position, the position in which it is shown, a "start" position and a "stop" position. When thrown to the "stop" position the key remains in that position until restored but when thrown to the "start" position it restores automatically when released.

The apparatus includes the necessary means for supplying current for operating the tubes and electro-magnets, and switches for turning the current on and off, as will be understood. The current supply means includes means for providing the tubes 53, 54, and 61 with a negative grid bias. A standard frequency generator is provided for driving the indicator drum at constant speed, as described in Patent No. 2,361,281 previously referred to. Assuming that the apparatus is used for timing balance wheels for 5 beat clocks, the indicator drum is preferably driven at a speed of 5 R. P. S. and the impulse transmitter 41—45 will accordingly transmit 5 impulses per second over the conductor 50.

The operation of timing a balance wheel will now be described. For this purpose it may be assumed that the various switches for supplying current are closed, and that the indicator drum is in rotation. The compressed air apparatus is in operation, delivering air under pressure to the main supply pipe 16.

When the current is turned on, the condenser 37 associated with the tube 35 charges in series with the plate resistor 65 and the voltage on the plate of the tube accordingly rises until the tube fires. The condenser 37 then discharges through the tube, causing the plate voltage to drop to such a low value that the tube is extinguished. The condenser 37 then charges again, and the action repeats itself. The values of resistance and capacity are such that the tube 35 fires at a frequency which is somewhat higher than the beat frequency of the balance wheels to be timed.

Each time the tube 35 fires the potential on its cathode rises suddenly, due to the drop across the cathode resistor 36, and a positive impulse is transmitted by way of condenser 38 to the control grid of the Strobotron tube 39 of the indicator. These positive impulses control tube 39 in known manner. That is, the tube fires on each impulse and is extinguished quickly each time by the discharge of condenser 40. The light flashes thus produced are seen by the operator through the window of the indicator and the indicator drum as a moving spot of light, affording evidence that the indicator is in working order.

The operator's key K may be in the position shown, but ordinarily will be in Stop position. If not, the operator will move the key to Stop position, thus opening contact 66 and breaking the plate circuit of tube 53. The tube 35 not only transmits positive impulses to the grid of tube 39 as described, but also transmits impulses by way of conductor 51, key contact 68, conductor 52, and condensers 70 and 71 to the grids of tubes 53 and 54. No effect is produced at tube 53, because the plate circuit of this tube is open. Tube 54 fires, however, and remains in conducting condition for the time being.

A balance wheel such as 2 may now be placed in position on the stand, with the end of the hairspring clamped between the rollers 4 and 5. Having seen to it that the balance wheel is free to oscillate, the operator will now throw the key K to Start position, thereby closing the plate circuit of tube 53 at contact 66. The operation of the key also closes a circuit for the electromagnet 15 at contact 67, disconnects conductor 51 from conductor 52 at contact 68 and connects conductors 50 and 52 at contact 69.

The electro-magnet 15 energizes responsive to the closure of its circuit and operates the valve 14, which closes the low pressure air passage through 18 and opens the direct passage by way of pipe 17. This prepares the apparatus for the delivery of strong starting air impulses to the balance wheel.

The closure of key contact 69 completes a circuit for the transmission of impulses from the indicator drum to the grids of tubes 53 and 54. The junction point 41 has a positive potential which approximates the potential to which the cathode of tube 35 rises when the tube fires, so that the impulses transmitted by the drum are positive impulses simulating those transmitted by the tube. The circuit extends from junction point 41 by way of brush 43, slip ring 42, segment 44, brush 45, conductor 50, key contact 69, conductor 52, and condensers 70 and 71 to the grids of tubes 53 and 54.

Tube 54 is now passing current so that the first positive impulse impressed on its grid over the above circuit has no effect. The positive impulse impressed on the grid of tube 53 causes the tube to fire. When tube 53 fires, the plate potential drops sharply, whereby a negative impulse is transmitted by way of condenser 55 to the plate of tube 54 and the latter tube is extinguished. Succeeding impulses cause the tubes to fire alternatively in known manner.

As noted in the foregoing, the first impulse received fires tube 53 and extinguishes tube 54, but has no other effect.

The two sections of tube 60 may be referred to as sections A and B, respectively, and the grid and plate elements likewise. Section A is passing current, grid A being connected to the cathode. Grid B is connected to ground and the positive potential on the cathode due to current flow in section A produces a negative bias on grid B, whereby section B does not pass current. This is a stable condition of the tube, in which condenser 74 becomes charged to substantially the potential of the +B lead, since there is no current flow through section B.

When the second impulse is received, the tube 54 fires and tube 53 is extinguished.

When tube 54 fires, the potential on the cathode rises suddenly, due to drop across the cathode resistor 72, and a positive impulse is transmitted to grid B of tube 60 by way of the condenser 62. Section B of the tube accordingly starts to pass current and the potential on plate B drops suddenly driving grid A negative due to the charged condition of the condenser 74.

The fall of potential on grid A decreases the current flow through section A, which causes the potential on plate A to rise. The rise of potential on plate A raises the potential on grid B, due to the coupling through condenser 73, which increases the current flow through section B and causes a further drop in potential at plate B. Thus a kind of regenerative action takes place whereby the voltage on plate B falls very quickly to a low value and the grid A attains a negative potential which biases section A to cut-off.

The condenser 74 now starts to discharge through section B of the tube and the potential on grid A gradually rises toward the cathode potential. When the grid potential rises to a high enough value so section A can begin to pass current, the regenerative action is repeated and the tube returns quickly to its original condition, with section A passing current and the grid of section B biased to cut-off.

The cessation of current flow through section B of tube 60 produces a sudden rise in potential at plate B thereby transmitting a positive impulse through condenser 63 to the control grid of the Thyratron tube 61, thereby causing this tube to fire. It may be noted here that the time delay between the receipt of the impulse from tube 54 and the transmission of the impulse to tube 61 is somewhat less than half a beat. The time can be adjusted by means of the potentiometer 64.

The condenser 75 has become charged through the resistor 76 and when the tube 61 fires, the condenser discharges in series with the tube and the winding of the electro-magnet 13. This gives a short powerful energization of the magnet and at the same time extinguishes the tube, owing to the high value of the resistor 76. The condenser 75 charges up again through the resistor.

The energization of the electro-magnet 13 opens the air valve 11 momentarily, thereby delivering an impulse of air to the rim of the balance wheel 2, setting it in motion in a clockwise direction. After one half beat, during which the hairspring is tensioned, the balance wheel stops. One full beat (one fifth second) has now elapsed since the transmission of the second impulse by the drum, so that the stop occurs concurrently with the transmission of the third impulse from the drum. This third impulse fires tube 53 and extinguishes tube 54, but without other effect.

Under the influence of the hairspring the balance wheel 2 now makes a half beat in the counterclockwise direction and continues through the mid-position for another half beat, tensioning the hairspring again, and again comes to a stop. This second stop, occurring one beat later than the first stop, is concurrent with the fourth impulse transmitted by the drum.

The fourth drum impulse fires tube 54 and extinguishes tube 53. When tube 54 fires, a positive impulse is transmitted to tube 60 which functions as already described and after a delay of about one half beat transmits a positive impulse to the tube 61. The latter tube accordingly fires and energizes electro-magnet 13 to open air valve 11 and deliver another air impulse to the balance wheel. The wheel is now moving in a clockwise direction and since there has been a delay of about one half beat the second air impulse impinges on the wheel when it is approximately in mid-position and is effective to accelerate its motion.

The fifth drum impulse fires tube 53 and extinguishes tube 54. Following the fifth impulse the balance wheel makes a beat in a counter-clockwise direction.

The sixth drum impulse fires tube 54 and extinguishes tube 53. Following the sixth impulse the balance wheel makes a beat in a clockwise direction and receives another air impulse about halfway through the beat. It will now be oscillating at approximately full amplitude.

When the balance wheel is set in motion as described in the foregoing, certain variations are produced in the current which flows through the photo cell 23. The photo cell current is responsive to light reflected from the rim of the wheel and the variations are due to movement of the wheel beneath the impinging light beam. Thus currents are generated while the wheel is in motion and cease when the wheel stops to reverse its direction of movement.

The photo cell currents are amplified by the amplifier 25 in known manner, and a voltage is developed across the winding of the potentiometer 27. This voltage, or a selected portion thereof, is delivered to the grid of the tube 28 and causes variations in the current in the plate circuit of the tube, said circuit including the primary winding of the transformer 29. Voltages are thereby induced in the secondary winding of the transformer which cooperates with the rectifier tube 30 to produce a flow of direct current in the load resistor 31. The direction of current flow is such that the potential at junction 32 is negative with respect to ground. The voltage is read on the voltmeter 33 and may be adjusted to the proper value for satisfactory operation by means of the potentiometer 27.

The photo cell currents being responsive to movement of the balance wheel, the negative potential at junction point 32 is manifested throughout each beat, falling to zero, however, at the end of each beat when the wheel stops to reverse its direction of motion.

The junction point 32 being connected to the grid of the tube 35, the negative potential produced at this point prevents the tube 35 from firing and the oscillating balance wheel thus takes control of the tube, slowing its firing frequency down to the beat frequency of the wheel.

The tube fires when the wheel stops at the end of each beat, due to the absence of voltage at junction 32.

In firing, the tube 35 transmits impulses as previously described. These impulses occur concurrently with the stops in the movement of the wheel or the ends of the beats, like the impulses transmitted by the drum, and consequently the impulses transmitted by the tube and the impulses transmitted by the drum are in phase, or substantially in phase.

The operator may now release the key, which restores to Run position, opening contacts 67 and 69 and closing contact 68. The opening of contact 67 opens the circuit of the electro-magnet 15 which de-energizes and permits the valve 14 to restore, whereby air at reduced pressure is supplied to the valve 11. The opening of contact 69 and closure of contact 68 disconnects conductor 52 from conductor 50 and connects it instead to conductor 51, thereby substituting tube 35 for the drum impulse transmitter 42—45 as regards the function of transmitting impulses to the tubes 53 and 54. The last impulse from the drum, as mentioned in the preceding description, was the sixth impulse. The seventh impulse comes from tube 35 and fires tube 53, extinguishing tube 54. The eighth impulse comes from tube 35 and fires tube 54, giving another air impulse to the wheel.

Since the valve 14 has been restored the last mentioned air impulse and the succeeding air impulses are relatively light impulses, referred to as running impulses, which have just sufficient force to keep the balance wheel oscillating at the proper amplitude. The transition from starting impulses to running impulses takes place smoothly upon restoration of the key. As mentioned previously, the key is preferably self-restoring from Start to Run position. The operator moves the key to Start position and holds it in that position while observing the indicator and noting the wheel's response to the starting air impulses. She is also able to hear the operation of air valve 11, and is thus advised when to release the key.

The number of starting impulses required depends somewhat on the type of balance wheel and on the air pressure used. It has been found in practice that most types of balance wheels can be started satisfactorily by two impulses without requiring an excessive air pressure. In the case of some types of balance wheels it is advisable to use three impulses. Having determined how many impulses are to be used, and having adjusted the air pressure accordingly, the operator can rely on the wheels starting and need only count the clicks of the valve each time and release the key after the required number of impulses have been delivered.

It will be seen therefore that except for putting the balance wheels in the fixture and taking them out the operator is free to observe the indicator, which tells her when each wheel is started, that is, when it takes over control of the indicator, and whether it is fast or slow. The timing operation is carried out by adjusting the length of the hairspring as described in the patents previously referred to herein.

The invention having been described that which is believed to be new and for which the protection of Letters Patent is desired will be pointed out in the appended claims.

I claim:

1. The combination, for use with a balance wheel and associated hairspring to be regulated, of means including an electro-magnetic air valve for delivering puffs of air to said wheel, means for generating a series of electrical impulses having a frequency equal to the correct beat frequency of said wheel, apparatus responsive to said impulses for transmitting a second series of electrical impulses to said valve at one half the beat frequency of said wheel, means responsive to the oscillation of the wheel for generating a third series of electrical impulses, and means for causing said apparatus to respond to said third series of impulses after responding to one or more impulses of said first series.

2. The combination, for use with a balance wheel and associated hairspring to be regulated, of means including an electro-magnetic air valve for delivering puffs of air to said wheel, means for generating a series of electrical impulses having a frequency equal to the correct beat frequency of said wheel, apparatus responsive to said impulses for transmitting a second series of electrical impulses to said valve at one half the beat frequency of said wheel, means responsive to the stopping of the wheel at the end of each beat for generating a third series of electrical impulses, means for delaying the impulses of the second series sufficiently to bring the impulses of said third series in phase with the impulses of said first series, and means for switching the control of said apparatus from said first series of impulses to said third series of impulses.

3. The combination, for use with a balance wheel and associated hairspring to be regulated, of means responsive to oscillation of said wheel for generating a series of electrical impulses, a device including a member rotating at constant speed for comparing the frequency of said impulses with a standard frequency, means including said constant speed member for generating a second series of electrical impulses, means responsive to the oscillation of said wheel for generating a third series of electrical impulses, and electromagnetically actuated air puff generating apparatus responsive to impulses of said second series to start the wheel in oscillation and responsive to impulses of said third series to maintain the wheel in oscillatory motion.

4. Apparatus for regulating the rate of a balance wheel and hairspring, comprising means responsive to oscillation of said wheel to generate a series of electrical impulses of beat frequency, a timing device for comparing the frequency of said impulses with a standard frequency, said timing device including means for generating a series of impulses having a frequency depending on said standard frequency, electromagnetically operated mechanism responsive to a plurality of impulses of said last mentioned series to start the oscillation of said wheel, and switching means operative after said wheel has been started to cause said mechanism to respond to impulses of said first mentioned series to continue said wheel in oscillation at its natural frequency, said mechanism comprising means for generating air puffs and delivering them to said wheel, whereby the wheel is started and continued in oscillation as set forth.

5. Apparatus as claimed in claim 4, wherein the electromagnetically operated mechanism comprises an air valve for delivering puffs of air to said wheel from a compressed air supply.

6. Apparatus as claimed in claim 5, wherein the switching means comprises a self-restoring manually operated key which is held in operated position to start the wheel, and wherein the air valve produces audible signals during operation which notify the operator when to release said key.

7. Apparatus for regulating the rate of a balance wheel and hairspring, comprising mechanism for driving said wheel by puffs of air, a timing device including a member rotated at constant speed, means including said constant speed member for generating a series of impulses, a manually operable key, a circuit completed by operation of said key to cause said mechanism to respond to a plurality of said impulses to start said wheel, means responsive to oscillation of said wheel to generate beat frequency impulses for timing by said timing device and impulses for driving said wheel, and a circuit completed by restoration of said key to cause said mechanism to respond to said driving impulses.

8. Apparatus as claimed in claim 7, wherein said mechanism includes means for delivering both strong and weak puffs of air to said wheel and means controlled by said key to switch from strong to weak impulses.

9. Apparatus for regulating the rate of a balance wheel and hairspring, comprising a member rotatable at constant speed, a control circuit, means including said constant speed member for transmitting impulses over said control circuit, mechanism controlled over said circuit responsive to said impulses to generate puffs of air to start said wheel, an input circuit to said timing device, a second control circuit, means responsive to oscillation of said wheel to transmit impulses of beat frequency over said input circuit and concurrently to transmit impulses over said second control circuit, and switching means arranged to substitute said second control circuit for said first control circuit after said wheel has started.

10. Apparatus for regulating the rate of a balance wheel and hairspring, comprising means including an electromagnetic air valve for delivering puffs of air to said wheel, means for generating a series of electrical impulses having a frequency equal to the correct beat frequency of said wheel, means responsive to oscillation of said wheel for generating a series of impulses at beat frequency, apparatus including a frequency divider adapted to respond to either series of impulses to operate said air valve at one half beat frequency, and manually operated switching means operative to cause said apparatus to respond to impulses of the first series to start said wheel and to subsequently cause said apparatus to respond to impulses of the second series to drive said wheel after it has been started.

PARKER B. WICKHAM.

REFERENCES CITED

The following references are of record in the file of this patent:

UNITED STATES PATENTS

| Number | Name | Date |
|---|---|---|
| 2,227,858 | Knobel | Jan. 7, 1941 |
| 2,231,849 | Gibbs | Feb. 11, 1941 |
| 2,358,078 | Kohlhagen | Sept. 12, 1944 |
| 2,361,281 | Gibbs | Oct. 24, 1944 |
| 2,423,985 | Kohlhagen | July 15, 1947 |